(12) United States Patent
Melby et al.

(10) Patent No.: US 7,107,134 B1
(45) Date of Patent: Sep. 12, 2006

(54) METHOD OF DETERMINING A DEFAULT TRANSMISSION OUTPUT SPEED

(75) Inventors: Steve L. Melby, Howell, MI (US); Andrew D. Herman, Linden, MI (US); Kenneth M. Simpson, Swartz Creek, MI (US); David Allen Dues, Howell, MI (US); Hallett D. Breidenbach, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/283,216

(22) Filed: Nov. 18, 2005

(51) Int. Cl.
*G06F 7/00* (2006.01)

(52) U.S. Cl. .................. 701/51; 701/57; 701/58; 701/63; 192/3.51

(58) Field of Classification Search .................. 701/51, 701/55, 56, 57, 58, 62, 63, 65, 67; 477/34, 477/77; 192/3.51, 3.54, 3.63
See application file for complete search history.

(56) References Cited

U.S. PATENT DOCUMENTS

| | | | | |
|---|---|---|---|---|
| 5,245,893 A | * | 9/1993 | Koenig et al. | 477/120 |
| 5,484,353 A | * | 1/1996 | Lux et al. | 477/169 |
| 5,778,329 A | * | 7/1998 | Officer et al. | 701/55 |
| 6,746,367 B1 | * | 6/2004 | Loeffler | 477/70 |
| 6,761,664 B1 | * | 7/2004 | Ayabe et al. | 477/144 |
| 6,832,147 B1 | * | 12/2004 | Vornehm et al. | 701/54 |
| 6,875,156 B1 | * | 4/2005 | Steiger | 477/158 |

* cited by examiner

*Primary Examiner*—Richard M. Camby
(74) *Attorney, Agent, or Firm*—Paul L. Marshall (57) ABSTRACT

A default value of transmission output speed in a motor vehicle powertrain having an automatic-shift multi-gear ratio power transmission is continuously updated based on a measured value of the output speed and other reliable speed data including transmission input speed and vehicle speed. The default value is substituted for the measured output speed when a malfunction of the output speed sensor is detected, and transitions back to the measured output speed when the output speed sensor malfunction is no longer present.

11 Claims, 7 Drawing Sheets

METHOD OF DETERMINING A DEFAULT TRANSMISSION OUTPUT SPEED

TECHNICAL FIELD

The present invention relates to electronic control of a motor vehicle powertrain, and more particularly to a method of determining a default value for the output speed of an automatic-shift multi-gear ratio power transmission in the event of an output speed sensor malfunction.

BACKGROUND OF THE INVENTION

Reliable measurement or estimation of various parameters of a motor vehicle powertrain is essential to proper electronic control of the powertrain components. For example, automatic shifting of a multi-gear ratio power transmission requires a reliable measure or estimation of the transmission output speed. While the essential parameters are often measured with dedicated sensors, the control must include provisions for operation of the powertrain components in the event of sensor malfunctions. For example, if a transmission output speed sensor malfunctions during operation of the vehicle, the powertrain controller can respond by reverting to a "limp-home" control mode in which the transmission only operates in a specified gear ratio. Alternatively, it may be possible for the powertrain controller to reliably determine a default value for the transmission output speed based on other sensor data and provide normal or near-normal control of the transmission based on the default value. For example, the transmission output speed may be calculated based on the vehicle speed if otherwise available, or on the transmission input speed and gear ratio if transmission shifting is not in progress. However, it can be difficult to determine if the vehicle speed signal is reliable, and more than one sensor may be faulty. Accordingly, what is needed is a method of determining a reliable default value of transmission output speed for use in powertrain control in the event of one or more sensor malfunctions.

SUMMARY OF THE INVENTION

The present invention provides an improved method of determining a default value of transmission output speed in a motor vehicle powertrain having an automatic-shift multi-gear ratio power transmission. The default output speed value is continuously updated based on the measured output speed and other reliable speed data including transmission input speed and vehicle speed. The default output speed value is available during shifting of the transmission and transitions to the measured output speed when the output speed sensor malfunction is no longer present.

DESCRIPTION OF THE PREFERRED EMBODIMENT

Figure 1:
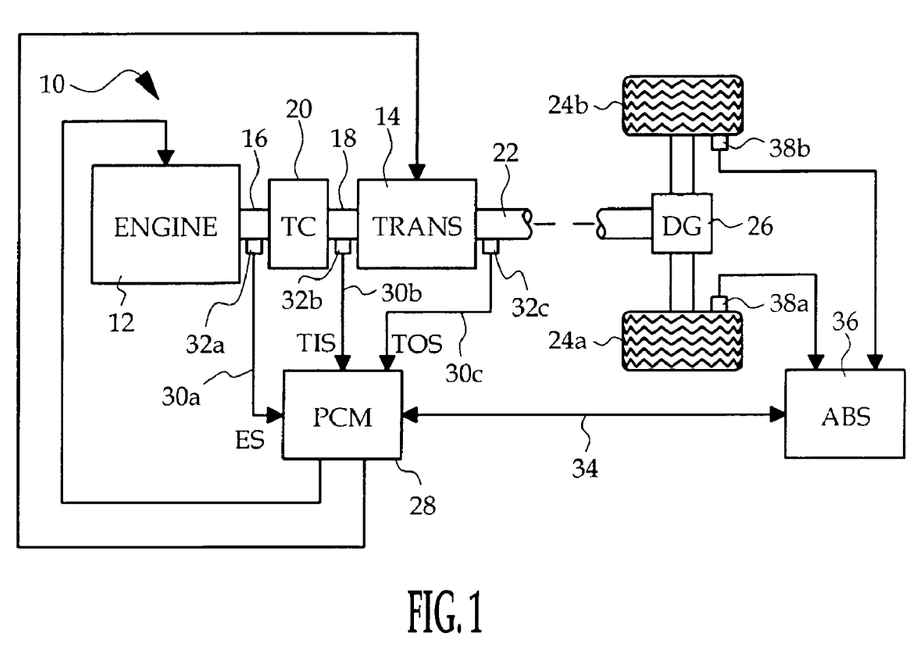
FIG. 1 is a diagram of a motor vehicle powertrain and a microprocessor-based powertrain control module (PCM) for carrying out the method of the present invention.

Referring to FIG. 1, the reference numeral 10 generally designates a motor vehicle powertrain including an internal combustion engine 12 and an automatic-shift multi-gear ratio power transmission 14. The engine output shaft 16 is coupled to the transmission input shaft 18 though a fluid coupling 20 such as a torque converter (TC), and the transmission output shaft 22 is coupled to drive wheels 24a, 24b through a differential gearset (DG) 26. A microprocessor-based powertrain control module (PCM) 28 regulates various control functions of the powertrain 10 such as engine fuel delivery and transmission shifting based on a number of measured and estimated powertrain parameters. The measured powertrain parameters depicted in FIG. 1 include an engine speed signal ES_SIGNAL on line 30a, a transmission input speed signal TIS_SIGNAL on line 30b and a transmission output speed signal TOS_SIGNAL on line 30c. The ES_SIGNAL is obtained from a sensor 32a responsive to the rotational speed of engine output shaft 16, the TIS_SIGNAL is obtained from a sensor 32b (referred to herein as the TIS sensor) responsive to the rotational speed of transmission input shaft 18, and the TOS_SIGNAL is obtained from a sensor 32c (referred to herein as the TOS sensor) responsive to the rotational speed of transmission output shaft 22. The PCM 28 obtains additional powertrain-related signals via a data bus 34 connected to other electronic modules of the vehicle. In the embodiment of FIG. 1, for example, the data bus 34 couples PCM 28 to an anti-lock brake system (ABS) controller 36. The ABS controller 36 determines a vehicle speed signal VS_SIGNAL based on data provided by wheel speed sensors 38a, 38b, and passes VS_SIGNAL and other parameters to PCM 28 via data bus 34.

One of the functions performed by PCM 28 is selecting a desired gear ratio for transmission 14, and initiating a shift to the desired gear ratio if necessary. Since the desired gear ratio is based in part on the transmission output speed signal TOS_SIGNAL provided by TOS sensor 32c, a malfunction of the TOS sensor 32c could result in a shift to an inappropriate gear ratio unless PCM 28 detects the malfunction and determines a default output speed value DEF_TOS to use in place of TOS_SIGNAL. For example, DEF_TOS can be determined from TIS_SIGNAL and the transmission gear ratio (TGR) if shifting is not in progress. Alternatively, DEF_TOS can be determined from VS_SIGNAL and the gear ratio (DGR) provided by differential gearset 26. However, it can be difficult to determine if VS_SIGNAL is reliable, and more than one sensor may malfunction at any given time. Accordingly, the present invention is directed to a method of determining a default output speed value DEF_TOS for use in maintaining the control of powertrain 10 in the event of one or more sensor malfunctions, and recovering from the default condition should the sensor(s) begin to operate normally. If a reliable value of DEF_TOS cannot be determined due to multiple sensor failures, the PCM 28 allows the transmission 14 to shift to a specified forward gear ratio ($3^{rd}$ gear, for example) for "limp-home" capability.

Figure 2A:
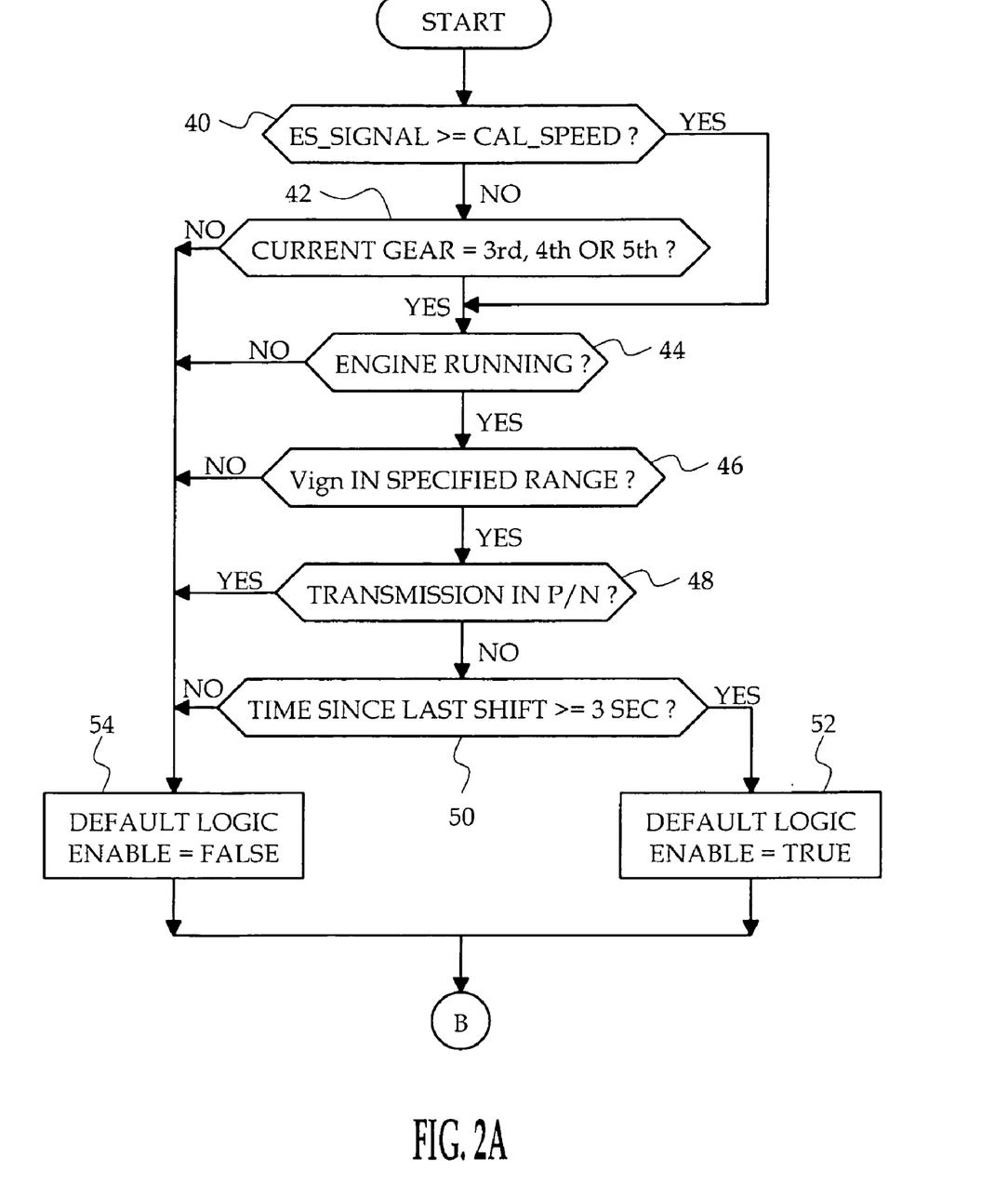
FIGS. 2A, 2B, 2C, 2D and 2E together form a flow diagram representing a software routine executed by the PCM of FIG. 1 according to this invention.

The flow diagrams of FIGS. 2A–2E depict a software routine periodically executed by PCM 28 for carrying out the method of the present invention. Referring to FIG. 2A, the blocks 40–50 define a series of entry conditions that must be met to enable use of the TOS default logic. To set the Default_Logic_Enable flag to True (block 52), the conditions defined by blocks 44, 46, 48 and 50 must be met in addition to the conditions defined by blocks 40 or 42. Thus, ES_SIGNAL must exceed a calibrated speed (CAL_SPEED) or the transmission 14 must be in $3^{rd}$, $4^{th}$ or $5^{th}$ gear, and the engine 12 must be running, the ignition voltage (Vign) must be within a specified range, the transmission 14 must not be in Park or Neutral, and the time since transmission shifting must be at least three seconds. If one or more of these conditions is not met, the block 54 sets the Default_Logic_Enable flag to False.

Figure 2B:
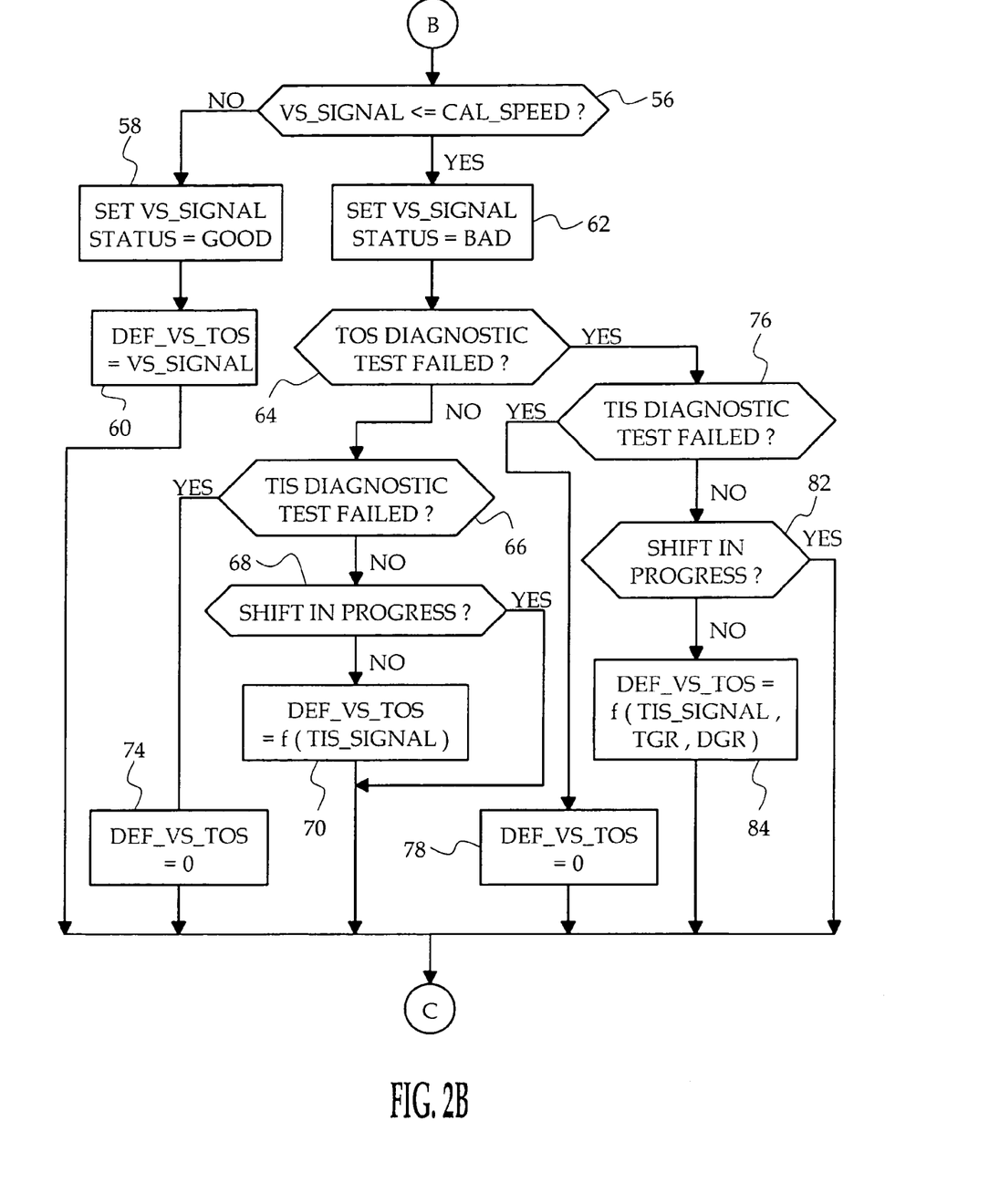

Referring to FIG. 2B, the blocks 56–84 determine a vehicle speed DEF_VS_TOS for use by the TOS default logic. Block 56 determines if VS_SIGNAL exceeds a low speed threshold CAL_SPEED; if so, the blocks 58 and 60 are executed to set the VS_SIGNAL Status flag to GOOD and to set DEF_VS_TOS equal to VS_SIGNAL. However, if VS_SIGNAL≦CAL_SPEED, the block 62 sets the VS_SIGNAL Status flag to BAD, and the blocks 64–66 check for malfunctions of the TIS and TOS sensors 32b and 32c. If blocks 64 and 66 determine neither sensor has failed diagnostic tests, the block 70 calculates DEF_VS_TOS based on TIS_SIGNAL so long as block 68 determines that a transmission shift is not in progress. The calculation of block 70 is given by:

$$DEF\_VS\_TOS = DGR*(TIS\_SIGNAL/TGR)$$

where DGR is the gear ratio of differential gearset 26 and TGR is the gear ratio of transmission 14, as mentioned above in respect to FIG. 1. If block 66 determines that the TIS sensor 32b has failed a diagnostic test, the block 74 sets DEF_VS_TOS to zero. If block 64 determines that the TOS sensor 32c has failed a diagnostic test, the block 76 determines if the TIS sensor 32b has also failed a diagnostic test. If so, the block 78 is executed to set DEF_VS_TOS to zero. If block 76 is answered in the negative, the TIS sensor 32b is presumed to be reliable, and block 84 calculates DEF_VS_TOS based on TIS_SIGNAL as described above so long as block 82 determines that a transmission shift is not in progress.

Figure 2C:
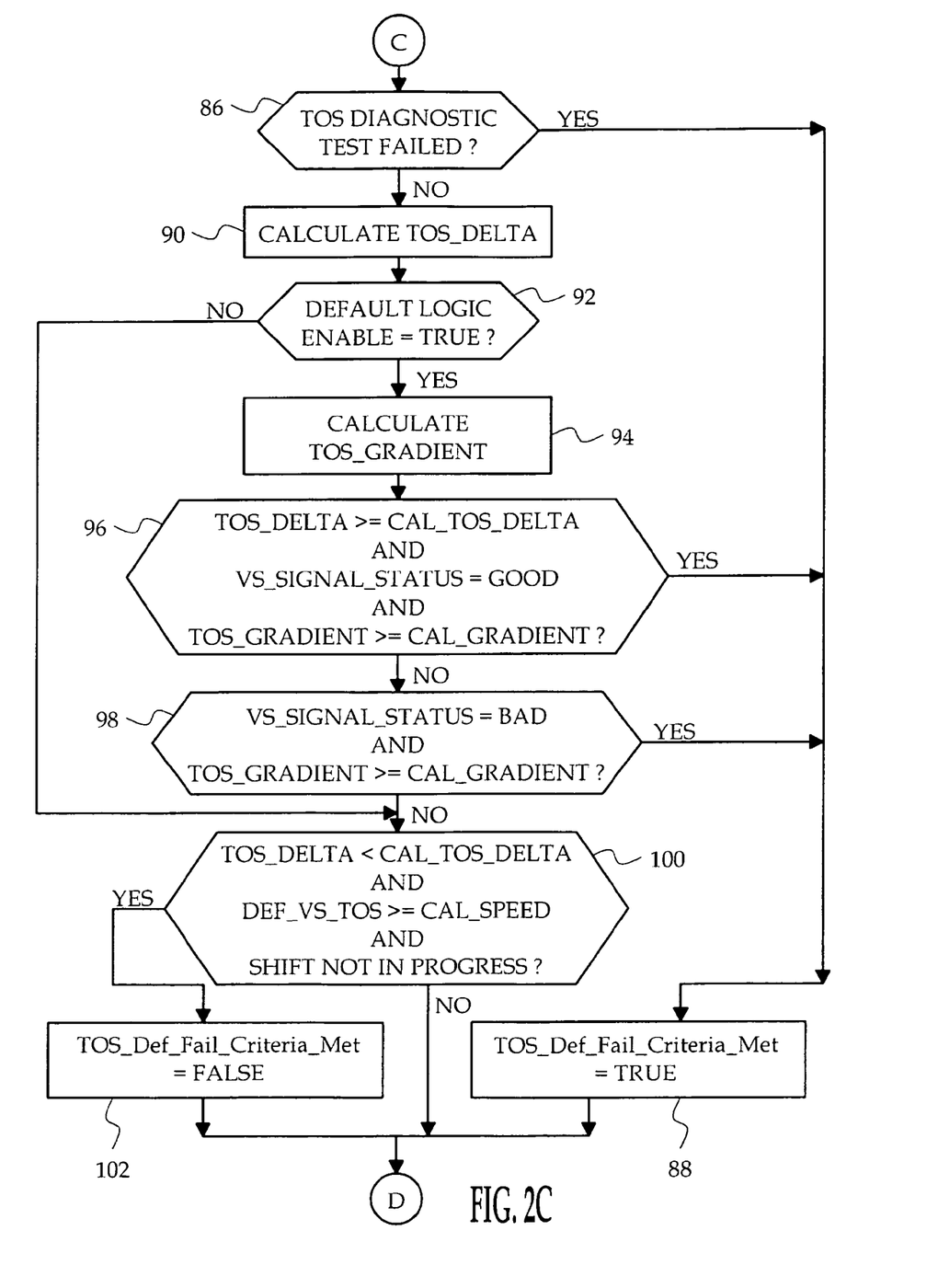

Referring to FIG. 2C, the blocks 86–102 determine if the TOS sensor 32c has malfunctioned and should be replaced by a default value. The block 86 determines if the TOS sensor 32c has failed a diagnostic test. If so, the block 88 is executed to set the TOS_Default_Fail_Criteria_Met flag to TRUE, indicating that a default value should be substituted for TOS_SIGNAL. If the TOS sensor diagnostic tests were passed, the block 90 calculates the magnitude of a difference TOS_DELTA between TOS_SIGNAL and a default TOS value calculated from DEF_VS_TOS. That is:

$$TOS\_DELTA = ABS[TOS\_SIGNAL - (DEF\_VS\_TOS*DGR)]$$

where ABS signifies an Absolute Value function and DGR is the gear ratio of the differential gearset 26 as mentioned above. As described below, blocks 96 and 100 use TOS_DELTA as a criteria for determining whether the TOS_Default_Fail_Criteria_Met flag should be set to TRUE or FALSE. Block 88 sets the TOS_Default_Fail_Criteria_Met flag to TRUE if a malfunction of the TOS sensor 32c is indicated, and block 102 sets the TOS_Default_Fail_Criteria_Met flag to FALSE if proper operation of the TOS sensor 32c is indicated.

If block 92 determines that the Default_Logic_Enable flag is TRUE, block 94 calculates a gradient or time rate of change (TOS_GRADIENT) of the TOS_SIGNAL. Block 96 indicates a malfunction of TOS sensor 32c if: (1) TOS_DELTA exceeds a calibrated value CAL_TOS_DELTA; (2) the VS_SIGNAL STATUS is GOOD; and (3) TOS_GRADIENT exceeds a calibrated value CAL_GRADIENT. Block 98 checks the condition where VS_SIGNAL_STATUS is BAD, and indicates a malfunction of TOS sensor 32c if TOS_GRADIENT exceeds CAL_GRADIENT. If the Default_Logic_Enable flag is FALSE or blocks 96 and 98 fail to identify a TOS sensor malfunction, block 100 is executed to determine if the TOS_Default_Fail_Criteria_Met flag should be cleared (i.e., set to FALSE). Block 100 causes block 102 to clear the TOS_Default_Fail_Criteria_Met flag if: (1) TOS_DELTA is less than CAL_TOS_DELTA; (2) DEF_VS_TOS exceeds a calibrated speed CAL_SPEED; and (3) a transmission shift is not in progress.

Figure 2D:
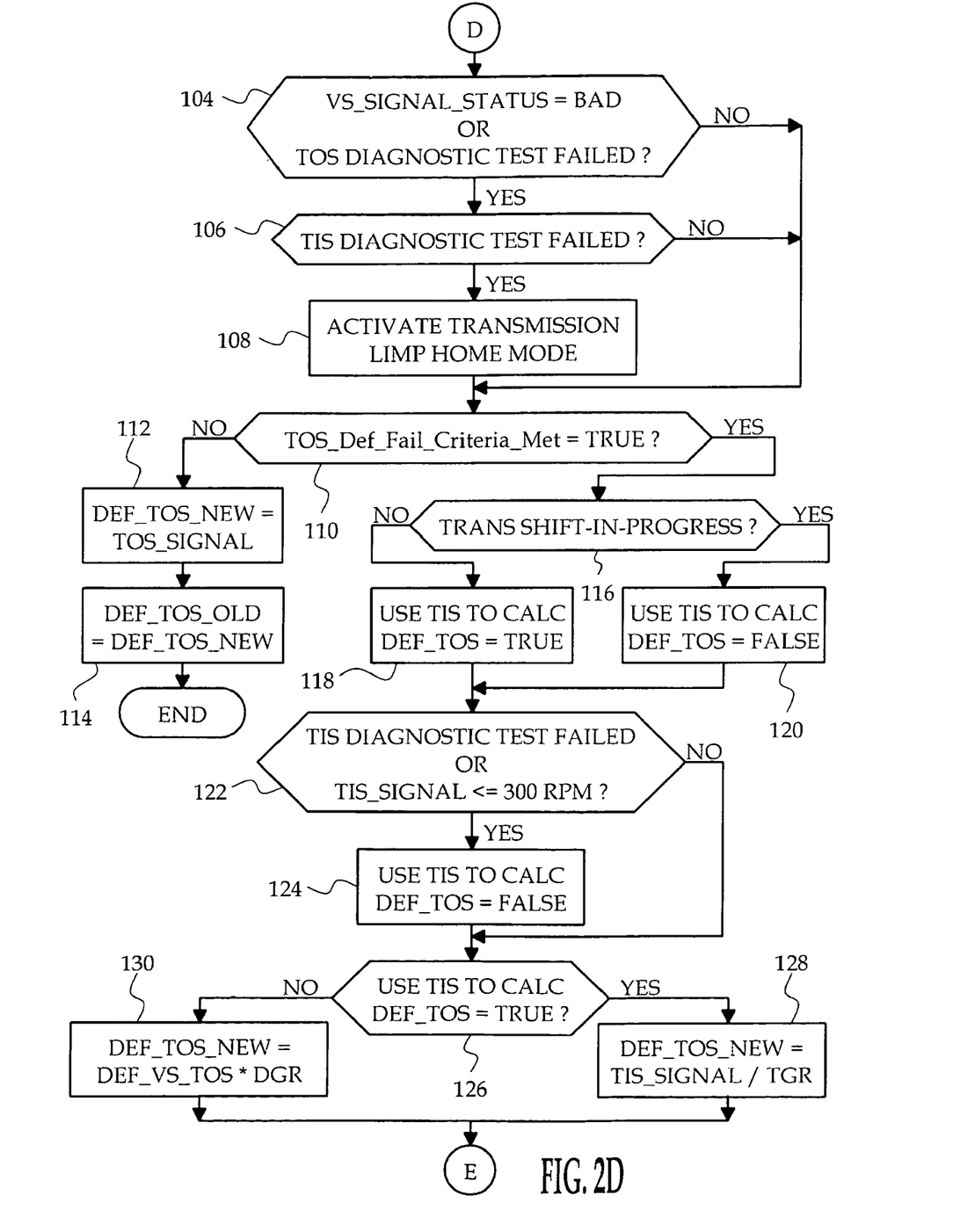
Figure 2E:
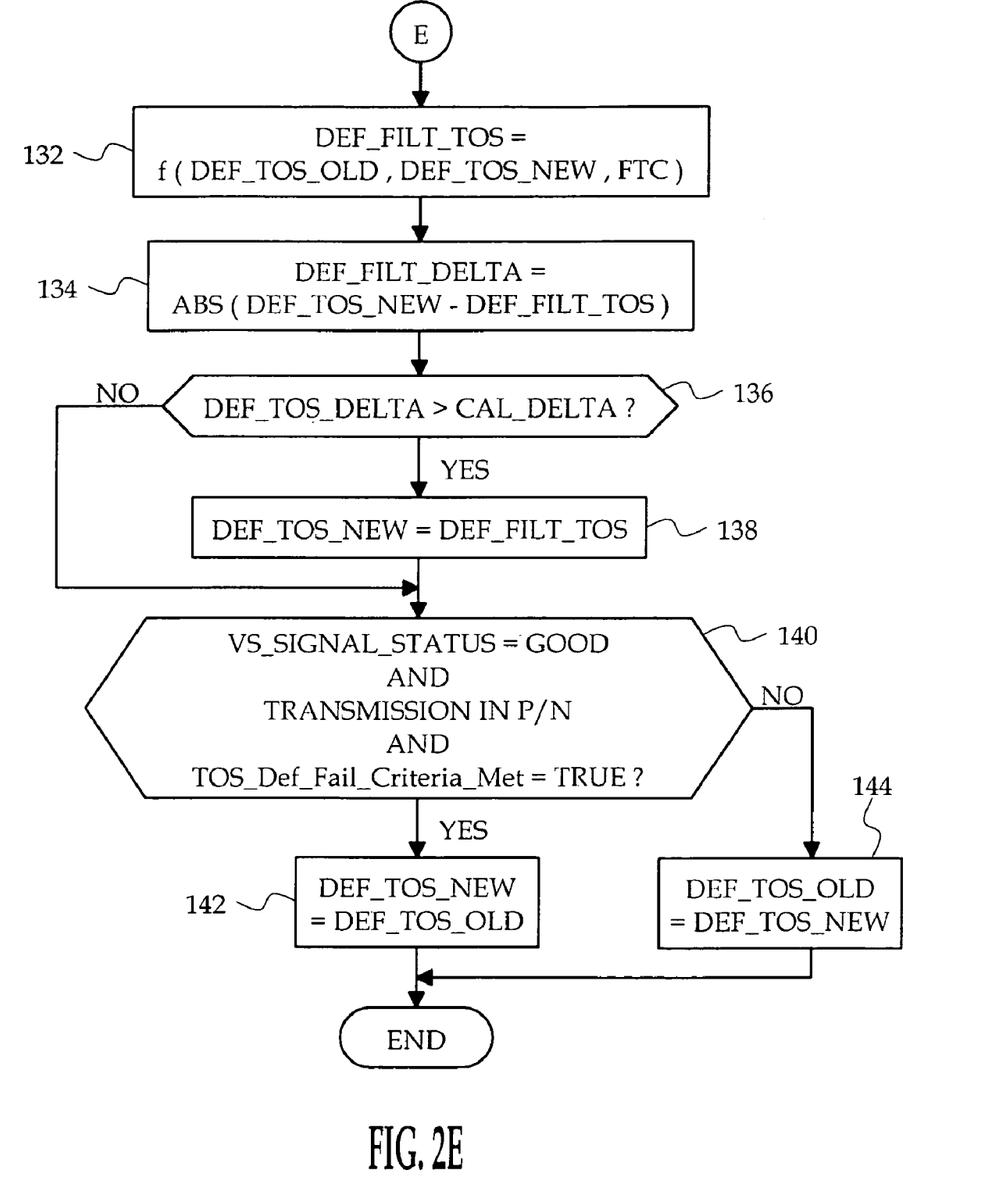

Referring to FIGS. 2D–2E, the blocks 104–106 check for multiple sensor failures. If both blocks are answered in the affirmative, the TIS_SIGNAL and at least one of the TOS_SIGNAL and VS_SIGNAL are not reliable, and the block 108 is executed to activate a "limp-home" mode of transmission 14. The "limp-home" mode may vary from transmission to transmission. In some cases, it will merely entail a mechanical default mode in which a specified forward gear ratio such as $3^{rd}$ gear is engaged; in other cases, there may be limited electrically-initiated shifting in the "limp-home" mode. However, concurrent malfunctions of the TOS_SIGNAL and the VS_SIGNAL do not activate the "limp-home" mode of transmission 14, so long as the TIS_SIGNAL is reliable, since the TOS_Default_Logic maintains its ability to provide a default TOS value under such conditions; see the illustration of FIG. 3 and the accompanying text below.

In any event, the blocks 110–144 are then executed determine an appropriate TOS default value. If block 110 determines that the TOS_Def_Fail_Criteria_Met flag is FALSE, the blocks 112 and 114 are executed to set DEF_TOS equal to TOS_SIGNAL and to set the variable DEF_TOS_OLD equal to DEF_TOS, completing the routine.

If block 110 determines that the TOS_Def_Fail_Criteria_Met flag is TRUE, the blocks 116–124 determine if the TIS_SIGNAL should be used to determine a default TOS value. The block 116 first checks for transmission shifting. If transmission shifting is not in progress, the block 118 sets the USE_TIS_SIGNAL flag to TRUE, indicating that TIS_SIGNAL can be used to determine a corresponding default TOS value. If transmission shifting is in progress, the default TOS value must be determined in some other way, and block 120 sets the USE_TIS_SIGNAL flag to FALSE. Also, blocks 122–124 set the USE_TIS_SIGNAL flag to FALSE if the TIS_SIGNAL is deemed to be unreliable due to a failed diagnostic test or a TIS_SIGNAL value below a low reference speed such as 300 RPM.

The block 126 checks the state of the USE_TIS_SIGNAL flag. If the flag is TRUE, block 128 computes a new default TOS value (DEF_TOS_NEW) by dividing TIS_SIGNAL by the transmission gear ratio TGR. If the USE_TIS_SIGNAL flag is FALSE, the block 130 computes DEF_TOS_NEW according to the product of DEF_VS_TOS and the gear ratio DGR of differential gearset 26. The block 132 then calculates a low pass filtered version DEF_FILT_TOS of the default TOS value using DEF_TOS_NEW, DEF_TOS_OLD and a filter time constant FTC. Blocks 134 and 136 determine if the difference DEF_TOS_DELTA between DEF_TOS_NEW and DEF_FILT_TOS is greater than a calibrated difference CAL_DELTA. If so, the block 138 sets DEF_TOS_NEW equal to the filtered version DEF_FILT_TOS; if not, the default calculation of blocks 128 or 130 is used without filtering. Finally, the block 140 determines if the transmission 14 has been shifted to Park (P) or Neutral (N). If so, the block 142 uses the previous TOS default value (i.e., DEF_TOS_OLD) for DEF_TOS_NEW, completing the routine. Otherwise, the block 144 updates DEF_TOS_OLD according to the value of DEF_TOS_NEW calculated at blocks 128, 130 or 138.

Figure 3:
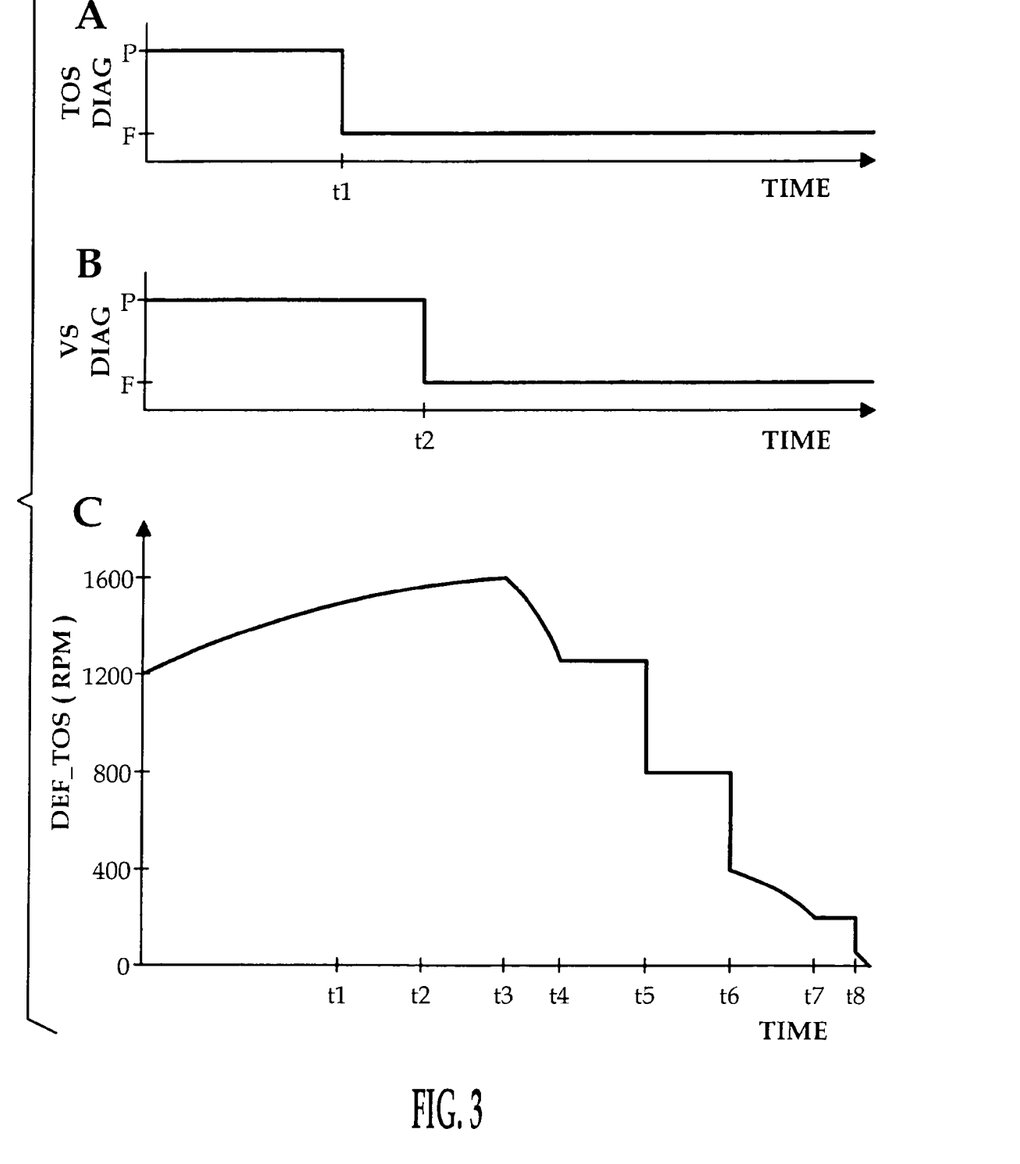
FIG. 3, Graphs A–C, depict the operation of the routine of FIGS. 2A–2E in the event of multiple sensor malfunctions.

Graphs A, B and C of FIG. 3 illustrate an operating condition involving concurrent malfunctions of the TOS_SIGNAL and the VS_SIGNAL, where only the TIS_SIGNAL remains available to the TOS Default_Logic. Graph A depicts the diagnostic status of the TOS_SIGNAL and Graph B depicts the diagnostic status of the VS_SIGNAL; in both cases, the letter P (pass) indicates that the signal is reliable, and the letter F (fail) indicates that the signal is faulty. Graph C depicts the default TOS signal (DEF_TOS) developed by the TOS_Default_Logic of FIGS. 2A–2E. As respectively depicted Graphs A and B, the TOS_SIGNAL becomes faulty at time t1, and the VS_SIGNAL becomes faulty a few seconds later at time t2. Referring to Graph C, the service brakes of the vehicle are applied at time t3, and the transmission 14 successively downshifts from $4^{th}$ gear to $1^{st}$ gear as the vehicle slows to a stop. The shift from $4^{th}$ to $3^{rd}$ occurs during the interval t4–t5, the shift from $3^{rd}$ to $2^{nd}$ occurs in the interval t5–t6, and the shift from $2^{nd}$ to $1^{st}$ occurs in the interval t7–t8.

Prior to time t1, the TOS_SIGNAL is reliable, and DEF_TOS simply tracks TOS_SIGNAL, as indicated at blocks 112–114 of the TOS Default_Logic. The failure of the TOS_SIGNAL at time t1 can be detected by conventional diagnostic testing or by the check performed at block 96 (block 98 if the VS_SIGNAL were faulty) of the TOS_Default_Logic. In either case, the TOS_Def_Fail_Criteria_Met flag is set to TRUE, causing PCM 28 to substitute DEF_TOS for TOS_SIGNAL. Blocks 116–130 of the TOS_Default Logic determine how DEF_TOS should be determined. Since the TIS_SIGNAL is reliable and transmission shifting is not in progress, the block 128 uses the TIS_SIGNAL to calculate DEF_TOS_NEW. So long as the VS_SIGNAL remains reliable, block 60 sets the default vehicle speed for TOS (DEF_VS_TOS) equal to the VS_SIGNAL. If transmission shifting were to occur prior to the VS_SIGNAL fault at time t2, block 130 would calculate DEF_TOS using the DEF_VS_TOS value based on VS_SIGNAL. However, when block 56 detects a faulty VS_SIGNAL at time t2, block 84 resets DEF_VS_TOS based on the TIS_SIGNAL. In the interval t2–t4, block 84 continues to update DEF_VS_TOS based on TIS_SIGNAL, and the block 128 continues to use the TIS_SIGNAL to calculate DEF_TOS_NEW.

During the 4–3 downshift interval t4–t5, DEF_VS_TOS remains fixed at its pre-shift value due to the operation of block 82, and block 130 updates DEF_TOS using the fixed DEF_VS_TOS value. Thus, DEF_TOS remains fixed during the downshift—this is required because the VS_SIGNAL is faulty and the usual ratiometric relationships between the TIS_SIGNAL and transmission output speed are not preserved during transmission shifting. In a momentary interval between the 4–3 downshift and the 3–2 downshift, blocks 82 and 116 are answered in the negative, and DEF_TOS once again updated based on TIS_SIGNAL; this accounts for the sharp drop in DEF_TOS at approximately time t5. The above process is continues until the VS_SIGNAL and/or TOS_SIGNAL are no longer faulty, as determined at blocks 56 and 100, respectively. That is, DEF_TOS is based on TIS_SIGNAL when shifting is not in progress, and held at a pre-shift value while shifting is in progress. If the VS_SIGNAL recovers while TOS_SIGNAL is still faulty, the TOS Default_Logic reverts to the mode of operation used in the interval t1–t2. When the TOS_SIGNAL recovers (regardless of whether the VS_SIGNAL is still faulty), block 102 sets the TOS_Def_Fail_Criteria_Met flag to FALSE once the criteria of block 100 are met, and block 112 updates DEF_TOS based on the TOS_SIGNAL.

As demonstrated above, the TOS_Default_Logic of the present invention continuously updates the default value of transmission output speed DEF_TOS_NEW during vehicle operation so that if a sensor malfunction occurs, the powertrain control can continue without interruption even if transmission shifting is in progress, and even if both the TOS_SIGNAL and the VS_SIGNAL become faulty. Additionally, the default value automatically transitions back to the TOS_SIGNAL when the sensor malfunction is no longer present.

While the present invention has been described with respect to the illustrated embodiment, it is recognized that numerous modifications and variations in addition to those mentioned herein will occur to those skilled in the art. For example, the TIS_SIGNAL can be derived from an engine speed measurement, the VS_SIGNAL can be obtained from a different source than shown, and so on. Accordingly, it is intended that the invention not be limited to the disclosed embodiment, but that it have the full scope permitted by the language of the following claims.

The invention claimed is:

1. A default method of operation for a motor vehicle powertrain (10) including a multi-gear ratio power transmission (14), transmission output speed measuring apparatus (32c), transmission input speed measuring apparatus (32b), and vehicle speed measuring apparatus (38a, 38b, 36), the method comprising the step of:
    detecting a malfunction (86, 96, 98) of the transmission output speed measuring apparatus (32c);
    in response to a detected malfunction of the transmission output speed measuring apparatus (32c), determining a default transmission output speed value based on an input speed signal (128) produced by the transmission input speed measuring apparatus (32b) during a non-shifting mode of operation of said power transmission (14), and based on a vehicle speed signal (130) produced by the vehicle speed measuring apparatus (38a, 38b, 36) during a shifting mode of operation of said power transmission (14); and
    substituting (28) said default transmission output speed value for an output speed signal produced by said transmission output speed measuring apparatus (32c) so long as a malfunction of said transmission output speed measuring apparatus (32c) is detected.

2. The method of claim 1, where the step of detecting a malfunction of the transmission output speed measuring apparatus (32c) includes the steps of:
    determining if said vehicle speed signal is reliable (56);
    if said vehicle speed signal is reliable, calculating an output speed value based on said vehicle speed signal (60), and a difference between the calculated output speed value and said output speed signal (90); and
    comparing the calculated difference to a calibrated difference (96).

3. The method of claim 1, where the step of detecting a malfunction of the transmission output speed measuring apparatus (32c) includes the steps of:
    calculating a gradient of said output speed signal (94); and
    comparing the calculated gradient to a calibrated gradient (96, 98).

4. The method of claim 1, including the steps of:
  detecting a recovery (100) of the transmission output speed measuring apparatus (32c); and
  substituting said output speed signal for said default transmission output speed value (28) when recovery of said transmission output speed measuring apparatus (32c) is detected.

5. The method of claim 4, where the step of detecting a recovery (100) of the transmission output speed measuring apparatus (32c) includes the steps of:
  determining if said vehicle speed signal is reliable (56);
  if said vehicle speed signal is reliable, calculating an output speed value based on said vehicle speed signal (60), and a difference between the calculated output speed value and said output speed signal (90); and
  comparing the calculated difference to a calibrated difference (100).

6. The method of claim 5, including the step of:
  comparing said output speed signal to a calibrated output speed signal (100).

7. The method of claim 1, including the steps of:
  determining if said vehicle speed signal is reliable (56);
  if a malfunction (86, 96, 98) of the transmission output speed measuring apparatus (32c) is detected, said vehicle speed signal is not reliable, and said transmission (14) is operating in said shifting mode (82, 116), determining said default transmission output speed value (130) based on a value of said input speed signal prior to said shifting mode of said transmission (14).

8. The method of claim 1, including the steps of:
  determining if said vehicle speed signal is reliable (56);
  if a malfunction (86, 96, 98) of the transmission output speed measuring apparatus (32c) is detected, said vehicle speed signal is not reliable, and said transmission is operating in said shifting mode (82, 116), maintaining said default transmission output speed value constant (13) during said shifting mode of said transmission (14).

9. The method of claim 1, including the steps of:
  low pass filtering said default transmission output speed signal (132);
  computing a difference between said default transmission output speed signal and said filtered default transmission output speed signal (134); and
  if the computed difference exceeds a calibrated difference (136), substituting (28) said filtered default transmission output speed value (138) for the output speed signal produced by said transmission output speed measuring apparatus (32c) so long as a malfunction of said transmission output speed measuring apparatus (32c) is detected.

10. The method of claim 1, including the step of:
  determining if said input speed signal is reliable (106);
  determining if said vehicle speed signal is reliable (56); and
  activating a limp-home mode (108) of said transmission (14) if said input speed signal is not reliable (106) and a malfunction of the transmission output speed measuring apparatus (32c) is detected (104).

11. The method of claim 1, including the step of:
  determining if said input speed signal is reliable (106);
  determining if said vehicle speed signal is reliable (56); and
  activating a limp-home mode (108) of said transmission (14) if said input speed signal is not reliable (106) and said vehicle speed signal is not reliable (104).

* * * * *